B. CELIE & H. C. AYERST.
COMBINED CHECK AND STOP VALVE.
APPLICATION FILED MAR. 7, 1912.
1,066,426.
Patented July 1, 1913.
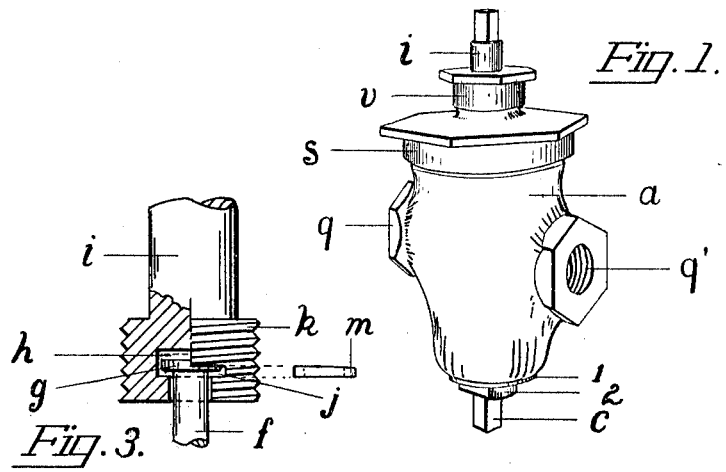
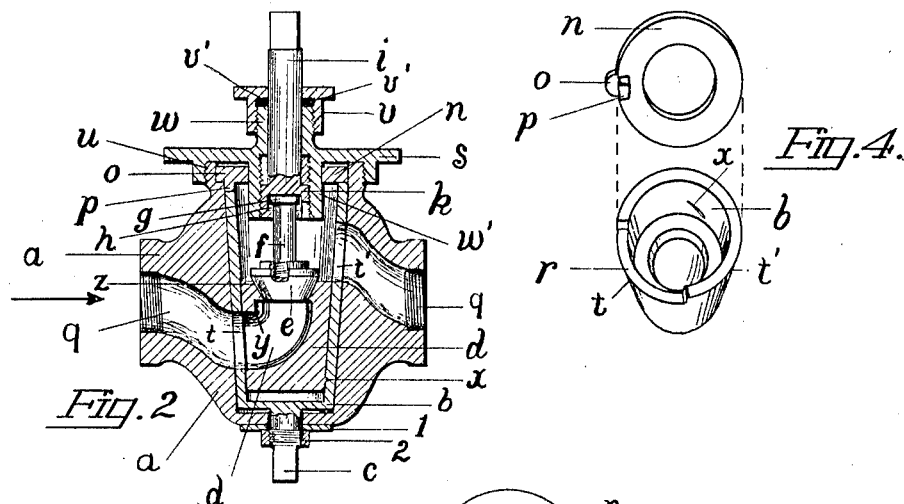
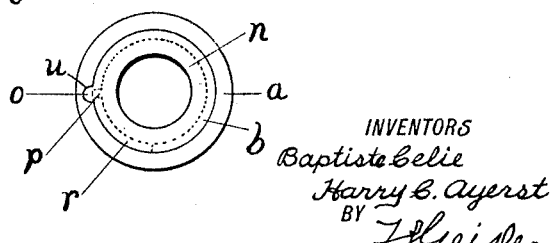
WITNESSES:
INVENTORS
Baptiste Celie
Harry C. Ayerst
BY
ATTORNEY

UNITED STATES PATENT OFFICE.

BAPTISTE CELIE AND HARRY C. AYERST, OF PORTLAND, OREGON.

COMBINED CHECK AND STOP VALVE.

1,066,426.  Specification of Letters Patent.  Patented July 1, 1913.

Application filed March 7, 1912. Serial No. 682,312.

*To all whom it may concern:*

Be it known that we, BAPTISTE CELIE and HARRY C. AYERST, citizens of the United States, and residents of the city of Portland, county of Multnomah, and State of Oregon, have invented a new and useful Improvement in Combined Check and Stop Valves, of which the following is a specification.

This invention relates to fluid valves and has for its object the providing of a non-leakable valve, also to embody therein efficient means for regulating the flow of the fluid through the valve. In other words, it is our purpose to so construct our valve that the mere rotation of the valve stem will be sufficient to adjust the valve to operate either as a common valve or as a check valve.

Our invention also has for its purpose the placing of our valve in a rotatable, ported sleeve-like housing, in which the valve-seat is contained, and in which the valve operates, so that by the adjustment of said sleeve the transmission of the fluid can be stopped when desired to examine or repair the parts of the valve.

Our invention further has for its purpose to adapt the parts to be inexpensively made and readily assembled and installed, and to take up the wear of service without becoming inefficient.

To this end our invention embodies the special features illustrated in the accompanying drawings constituting a part of this specification.

In the drawings: Figure 1 is a perspective view of our valve as positioned in a regular form of pipe connection; Fig. 2 is a vertical, longitudinal section of the valve and its connections, showing the valve closed; Fig. 3 is a larger-scale detail illustrating the construction of the means adjustably connecting the main valve-stem with the stub-stem of the valve disk, whereby our valve may be adjusted to act as a stop-valve or a check-valve, as desired; Fig. 4 is a disassembled perspective view of the removable sleeve of our valve and the ring-like plate supported on the upper end of such sleeve; Fig. 5 is a top view of the valve casing, showing in broken line the top of the sleeve located in the chamber of the valve casing, and the means provided for locking such ring-like plate against rotation.

$a$ represents the valve casing formed with ports $q$, $q'$ the external ends of which are threaded so as to be adapted to receive the threaded extremities of the pipes, as usual. The casing, $a$, is made with a conical vertical chamber, in which is seated a conical, sleeve-like rotatable housing, $b$, provided with ports $t$, $t'$. In the sleeve-like housing, $b$, is removably contained a conical valve seat $d$, formed with a curved transmission port, $d'$, leading through the top and one side. The upper end of said port is adapted to provide a conical seating-surface, $z$, for the conical valve disk $e$, removably affixed on the lower end of a stub-stem $f$, formed at its upper end with a flange-head $g$. The valve-seat, $d$, is also formed with an external segmental thread or lug $x$, adapted to be engaged in a corresponding thread 4 formed on the interior of the sleeve $b$, as shown in Fig. 4. The purpose of the last described construction is to lock the valve-seat $d$ in place in the sleeve $b$.

On the rim of the sleeve-like housing, $b$, rests a ring-like plate, $n$, formed with a laterally projecting lug $o$, and on its under side with a lug $p$, as more clearly shown in the upper portion of Fig. 4.

The rim of the casing is formed with a cavity $u$ (see Fig. 5) in which to receive the lug $o$ of the plate $n$, and the rim of the sleeve-like housing, $b$, has a segmental portion cut away as at $r$ to receive the lug $p$ of the plate $n$, and thus permit the sleeve-like housing, $b$, to be turned one quarter around, for the purpose of bringing the port $t$ into and out of registration with the related port, $q$, of the casing $a$. On the rim of the casing, $a$, is threaded a cap $s$, formed with an integral, externally threaded axially bored neck, $w$, above, and below with a socket $w'$ internally threaded, in which to receive the externally threaded enlargement or head $k$ formed on the lower end of the main valve stem $i$. The enlargement $k$ is provided with a cavity $h$, formed with an inlet slot, as more clearly shown at $j$ in Fig. 3, to permit the insertion and removal of the flange-head $g$ of the stub-stem $f$. On the neck, $w$, is threaded a gland $v$, for holding a packing, as at $v'$.

As more clearly shown in Fig. 2, the sleeve-like housing, $b$, is formed at the bottom with a projecting stem $c$, extending through the bottom of the casing $a$; said stem being threaded to receive the nut 2, bearing on a washer 1, and being adapted to have a wrench affixed thereon, whereby to give the sleeve a quarter turn, so as to bring its ports, $t$, $t'$, into and out of registration with the posts $q$ and $q'$ of the casing $a$, and the port $d'$ of the valve-seat $d$. Normally the nut 2 is tightened sufficiently to secure the sleeve-like housing $b$ against rotation, and loosened when sleeve is to be rotated. When the sleeve-like housing $b$ has been rotated to close the passage through the port $d'$ of the valve seat $d$, the valve mechanism may be removed for inspection and repair; the flow of the fluid being in the direction indicated by the arrow in Fig. 2.

The action of my valve is as follows: The valve stem $i$ has three relative positions, full open, closed, and intermediate. That is to say, when rotated to the right, by a wrench affixed to its squared end, the valve disk $e$ will finally be brought to bear tightly against its seating surface, $z$, in the valve seat $d$, and the valve will be closed, acting in this instance as a mere stop-valve, in which position it is illustrated in Fig. 2. If the valve stem $i$ be rotated to the left, to its intermediate position, the head $k$ thereof will be raised to the position relieving the pressure on the flange head $g$ of the stub valve stem $f$, and the valve disk $e$ may then act as a check valve. Further turning of the valve stem $i$ in the same direction will raise the valve disk $e$ to such an extent as to maintain the valve open all the time.

The vertical shoulders at the extremity of the segmental recess, $r$, in the sleeve-like housing, $b$, provide means for informing the operator of the relative position of the sleeve-like housing, $b$, since when the lug $p$ is brought into abutment with either of said shoulders the port of the sleeve is correspondingly brought into or out of registration with the related ports in the casing and the valve-seat.

We claim:

1. A valve comprising a casing formed with a conical chamber, a conical, removable valve-seat having a transmission port extending through the top and one side; said valve-seat located in the lower part of the chamber of the valve casing, the latter formed with an inlet port registering with the port opening in the side of the valve-seat, the casing further formed with an outlet port located above the top of the valve-seat; the port opening at the top of the valve-seat being formed to constitute a seating surface for the valve-disk; a valve-disk adapted to be seated on said valve-seat; said valve-disk provided with a stub-stem; a valve stem extending externally of the casing, said valve stem being longitudinally adjustable; a connection interior of the valve chamber between said valve-stem and the stub-stem of the valve-disk adapted to permit the valve-disk to act as a check valve when the valve stem is adjusted to its intermediate position; a sleeve-like, rotatable housing in the valve chamber, encompassing the valve-seat and the valve-disk, having ports located to be registered with the ports of the valve casing; an externally projecting stem on the bottom of the sleeve-like housing for rotating the latter; means limiting the rotation of said sleeve-like housing to the opening and closing of the ports of the valve casing; and means for securing the sleeve against rotation.

2. A valve comprising a casing formed with a conical chamber, a conical, removable valve-seat having a transmission port extending through the top and one side; said valve-seat located in the lower part of the chamber of the valve casing, the latter formed with an inlet port registering with the port opening in the side of the valve-seat, the casing further formed with an outlet port located above the top of the valve-seat; the port opening at the top of the valve-seat being formed to constitute a seating surface for the valve-disk; a valve disk adapted to be seated on said valve seat; said valve-disk provided with a stub-stem; a valve stem extending externally of the casing, said valve stem being longitudinally adjustable a connection interior of the valve chamber between said valve-stem and the stub-stem of the valve-disk adapted to permit the valve-disk to act as a check valve when the valve-stem is adjusted to its intermediate position; a sleeve-like, rotatable housing in the valve chamber, encompassing the valve-seat and the valve-disk, having ports located to be registered with the ports of the valve casing; an externally projecting stem on the bottom of the sleeve-like housing for rotating the latter; means limiting the rotation of said sleeve-like housing to the opening and closing of the ports of the valve casing; and a washer and lock-nut on said projecting stem of the sleeve.

3. A valve comprising a casing formed with a conical chamber; a conical, removable valve-seat having a transmission port extending through the top and one side; said valve-seat located in the lower part of the chamber of the valve casing, the latter formed with an inlet port registering with the port opening in the side of the valve-seat, the casing further formed with an outlet port located above the top of the valve-seat; the port opening at the top of the valve-seat being formed to constitute a seating surface for the valve-disk; a valve-disk adapted to be seated on said valve-seat, said valve-disk provided with a stub stem, a valve-stem extending externally of the casing, said valve-stem being longitudinally adjustable; a connection interior of the valve chamber between said valve-stem and the stub-stem of the valve-disk adapted to permit the valve-disk to act as a check valve when the valve stem is adjusted to its intermediate position; a cap on the casing in which said valve stem is threaded; a sleeve-like, rotatable housing in the valve chamber, encompassing the valve-seat and the valve-disk, having ports located to be registered with the ports of the valve casing; an externally projecting stem on the bottom of the sleeve-like housing for rotating the latter; means limiting the rotation of said sleeve-like housing to the opening and closing of the ports of the valve casing; and means for securing the sleeve against rotation.

4. In a valve, the combination of a chambered casing; a removable valve-seat having a transmission port extending through the top and one side; said valve-seat located in the lower part of the chamber of the valve casing, the latter formed with an inlet port registering with the port opening in the side of the valve-seat, the casing further formed with an outlet port located above the top of the valve-seat; the port opening at the top of the valve-seat being formed to constitute a seating surface for the valve-disk; a valve-disk adapted to be seated on said valve-seat; said valve-disk provided with a stub-stem; a valve stem extending externally of the casing, said valve stem being longitudinally adjustable; a connection between said valve-stem and the stub-stem of the valve-disk adapted to permit the valve-disk to act as a check valve when the valve stem is adjusted to its intermdiate position; a sleeve-like, rotatable housing in the valve chamber, encompassing the valve-seat and the valve-disk, having ports located to be registered with the ports of the valve casing; an externally projecting stem on the bottom of the sleeve-like housing for rotating the latter; and means for securing the sleeve against rotation.

5. In a valve, the combination of a chambered casing; a removable valve-seat having a transmission port extending through the top and one side; said valve-seat located in the lower part of the chamber of the valve casing, the latter formed with an inlet port registering with the port opening in the side of the valve-seat, the casing further formed with an outlet port located above the top of the valve-seat; the port opening at the top of the valve-seat being formed to constitute a seating surface for the valve-disk; a valve-disk adapted to be seated on said valve-seat; said valve-disk provided with a stub-stem; a valve stem extending externally of the casing, said valve stem being longitudinally adjustable; a connection between said valve-stem and the stub-stem of the valve disk adapted to permit the valve-disk to act as a check valve when the valve stem is adjusted to its intermediate position; a sleeve-like, rotatable housing in the valve chamber, encompassing the valve-seat and the valve-disk, having ports located to be registered with the ports of the valve casing; an externally projecting stem on the bottom of the sleeve-like housing for rotating the latter; means limiting the rotation of said sleeve-like housing to the opening and closing of the ports of the valve casing; and means for securing the sleeve against rotation.

BAPTISTE CELIE.
HARRY C. AYERST.

Witnesses:
    CECIL LONG,
    W. LEWIS COOP.

Copies of this patent may be obtained for five cents each, by addressing the "Commissioner of Patents, Washington, D. C."